United States Patent Office 3,342,744
Patented Sept. 19, 1967

3,342,744
SINTERED URANIUM DIOXIDE-IRIDIUM COMPOSITION AND METHOD OF PREPARATION
Charles Anthony Elyard, Wolston, Coventry, and Terence Jefferson Potter, Rugby, England, assignors to United Kingdom Atomic Energy Authority, London, England
No Drawing. Filed Apr. 15, 1966, Ser. No. 542,973
Claims priority, application Great Britain, Apr. 23, 1965, 17,197/65
7 Claims. (Cl. 252—301.1)

This invention is concerned with the preparation of uranium dioxide for use in nuclear reactors.

When polycrystalline ceramic uranium dioxide ($UO_2$) is employed as a fuel in a nuclear reactor and is irradiated for long periods of time at high temperatures, stable gases, in particular xenon and krypton, are produced as a result of the fission of $U^{235}$ nuclei and are released from the ceramic at a rate which is determined by the temperature of the ceramic. If too much xenon and krypton are liberated (for example, because the temperature may be above 1600° C.) a high gas pressure will be set up within the container holding the $UO_2$ fuel, and there is a risk that the container may burst. Further, it is usual to include a quantity of helium gas in the container in order to assist the transfer of heat from the surface of the $UO_2$ to the container. Addition of xenon and krypton to this helium results in a reduction of its thermal conductivity and may result in overheating of the $UO_2$.

At temperatures of 1600° C. and lower, the release of xenon and krypton from ceramic $UO_2$ is believed to take place by the diffusion of these gases through the solid ceramic to a surface from which they are released and the rate of release can be reduced by making the ceramic as dense as possible. At these temperatures relatively little structural change occurs in the ceramic, although there may be a little grain growth at 1600° C. At higher temperatures, however, and particularly where a steep thermal gradient exists, as for instance between the centre and the outside of a $UO_2$ ceramic fuel, major structural changes can occur in the $UO_2$ and give much poorer properties in that the fission gases may be released more rapidly. The normal equi-axed grain structure is changed and columnar grains are formed with a length much greater than their breadth. These columnar grains lie along the direction of the temperature gradient. Frequently, transverse voids exist across the columnar grains and a central void is formed in the fuel. Typically a $UO_2$ ceramic with a grain size of the order of 10 microns may change to show columnar grains many hundred microns in length by a few tens of microns in breadth. It has been observed in a pile that a rapid release of fission xenon and krypton is associated with these major changes in structure. Thus in designing nuclear reactors it is necessary to limit the centre temperature of a uranium dioxide fuel to a maximum of 1600° C. to avoid excessive gas release, but even so it is possible for overheating to occur under certain fault conditions. A form of ceramic uranium dioxide which does not undergo columnar grain growth is therefore desirable.

According to the present invention, a $UO_2$ ceramic which does not undergo columnar grain growth when subjected to steep temperature gradients at temperatures in excess of 1600° C. may be prepared by incorporating small amounts of certain refractory metals with the $UO_2$. In particular the metal iridium in concentrations between 0.1 and 4 wt. percent has been found to be suitable for this purpose. The preferred concentration range is 0.2 to 2 wt. percent.

Iridum may be incorporated in the $UO_2$ in various ways; such as by mixing finely powdered iridium metal with $UO_2$ powder prior to sintering, or by mixing an iridium compound with $UO_2$ powder, by physical mixing or by chemical precipitation etc., and subsequently decomposing the compound to produce metallic indium.

The preferred method of incorporating iridium in the $UO_2$ is to add a solution of an iridium compound to the $UO_2$ powder, dry the resulting slurry and convert the iridium compound to the metal by heating in a reducing or neutral atmosphere. This conversion may be achieved, either as a separate stage in the process, by heating the dried powder to a temperature of at least 400° C. in a suitable atmosphere, or it may be allowed to take place during the subsequent sintering of the $UO_2$. Fabrication of a ceramic from the treated powder is by conventional ceramic techniques: the powder may, for example, be die-pressed, slip cast or extruded and then sintered (it is to be noted that in the slip casting and extrusion processes a liquid is mixed with the $UO_2$ powder and that if the iridium compound is to be converted to the metal during the sintering process it is preferable that the liquid employed should not dissolve the iridium compound). Sintering may be performed in a reducing atmosphere such as hydrogen or in a neutral atmosphere such as argon. As the stoichiometric form of $UO_2$ is preferred for use as a reactor fuel, a subsequent firing in hydrogen is required if sintering is performed in a neutral atmosphere, in order to ensure that the $UO_2$ does not contain excess oxygen.

Whilst it has been stated above that metallic iridium is present in ceramics prepared by the methods described, and we believe this to be so, it is possible that reaction of the metallic iridium with the uranium dioxide results in the formation of compounds which might be present either as a very finely divided second phase in the ceramic or dissolved in the $UO_2$.

EXAMPLE

A ceramic containing 0.5 wt. percent of iridium was prepared in the following manner:

An aqueous solution of ammonium chloro-iridite, $(NH_4)_3IrCl_6 \cdot H_2O$, containing 2 gm. Ir/100 ml. was prepared and 25 ml. of this solution was mixed with 100 gm. of a uranium dioxide powder of composition $UO_{2.04}$ and sufficient water to form a thick slurry which was then dried in an oven. A polybutyl methacrylate binder was added to the resulting powder, which was then die-pressed at a pressure of 25 tons/sq. in. The binder was then removed from the pressed compacts by heating slowly to 800° C. in a hydrogen atmosphere and holding at that temperature for two hours. It is believed that during this part of the process the ammonium chloro-iridite was converted to iridium metal.

Subsequently the compacts were sintered in a hydrogen atmosphere by heating at a rate of 400° C. per hour to a temperature of 1750° C. and holding at that temperature for two hours. A ceramic prepared in this way had a density of 10.54 gm./cc. The grain size of the material was about five microns, as determined by microscopic examination of polished and etched specimens.

This ceramic was then subjected to a thermal gradient in an arc image furnace by attaching one face of a cylindrical specimen ¼″ long to a water cooled copper block whilst the opposite face was heated to a temperature of 1800° C. This test was performed in an argon atmosphere for a period of 25 hours and the specimen was then examined by sectioning along its length (i.e. along the thermal gradient), polishing and etching. Although some equi-axed grain growth had occurred in the hottest regions of this specimen to give a grain size of the order of 25 microns, no columnar grain growth had occurred. The suppression of columnar grain growth in sintered uranium dioxide bodies by the addition of iridium as exemplified above has been found to occur with iridium additions in the range of concentrations between 0.1 and 4 wt. percent and more particularly with iridium additions in the range of concentrations between 0.2 and 2 wt. percent.

For comparison, a uranium dioxide ceramic containing no iridium addition was heated in an arc image furnace in a similar manner. The grain size of this material before heating was of the order of ten microns; after heating, columnar grains about 250 microns in length by 40 microns in breadth were found in the hottest region.

We claim:

1. Uranium dioxide ceramics which do not exhibit columnar grain growth when subjected to severe temperature gradients at temperatures in the range 1600 to 2000° C. by virtue of the content of 0.1 to 4 wt. percent or iridium.

2. Uranium dioxide ceramics which do not exhibit columnar grain growth when subjected to severe temperature gradients at temperatures in the range 1600 to 2000° C. by virtue of a content of 0.2 to 2 wt. percent of iridium.

3. Uranium dioxide ceramics as claimed in claim 2 in which the uranium in the uranium dioxide has been enriched and contains a higher proportion of the uranium isotope of mass 235 than does naturally occurring uranium.

4. A process for the preparation of uranium dioxide ceramics containing 0.1 to 4 wt. percent iridium wherein the iridium is added by mixing a solution of an iridium compound with uranium dioxide powder to form a slurry, drying the slurry to give a powder containing a fine dispersion of the iridium compound, decomposing the compound and subsequently fabricating a ceramic from the powder.

5. A process for the preparation of uranium dioxide ceramics as claimed in claim 4 wherein the decomposition of the iridium compound takes place during the fabrication of a ceramic from the powder containing the compound.

6. A process for the preparation of uranium dioxide ceramics as claimed in claim 4 wherein the iridium compound used is ammonium chloro-iridite $(NH_4)_3IrCl_6 \cdot H_2O$.

7. A process for the preparation of uranium dioxide ceramics as claimed in claim 1 wherein the iridium compound used is ammonium chloro-iridite $(NH_4)_3IrCl_6 \cdot H_2O$.

References Cited

Nuclear Science Abstracts, NSA–20874, vol. 18, No. 12, June 30, 1964.

BENJAMIN R. PADGETT, Primary Examiner.

S. J. LECHERT, JR., Assistant Examiner.